United States Patent [19]
Oshima et al.

[11] Patent Number: 5,054,652
[45] Date of Patent: Oct. 8, 1991

[54] DEVICE AND METHOD FOR CONTROLLING DISTRIBUTIVE FEEDING DEVICE

[75] Inventors: Yasushi Oshima, Akashi; Isao Miyamoto, Himeji; Shogo Harada, Hyogo, all of Japan

[73] Assignee: Yamato Scale Company, Limited, Akashi, Japan

[21] Appl. No.: 422,955

[22] Filed: Oct. 18, 1989

[30] Foreign Application Priority Data

Nov. 16, 1988 [JP] Japan .................. 63-290570

[51] Int. Cl.$^5$ ............................................. G01G 13/00
[52] U.S. Cl. .......................................... 222/1; 222/55; 222/56; 222/77
[58] Field of Search ................. 222/1, 55, 56, 77; 177/25.18

[56] References Cited

FOREIGN PATENT DOCUMENTS

145942 11/1980 Japan ................................ 222/56
S60-196626 10/1985 Japan .

Primary Examiner—Michael S. Huppert
Assistant Examiner—Philippe Derakshani
Attorney, Agent, or Firm—Senniger, Powers, Leavitt & Roedel

[57] ABSTRACT

A feed control device and method of reducing variations in the amount of product fed to receiving units from a dispersion feeding device of the type comprising a dispensing mechanism for dispersively dispensing product fed thereto radially toward the periphery thereof, and a feeding mechanism for feeding the product to a product feeding position on the dispensing mechanism. The control device includes apparatus for determining the displacement of the center of gravity of the dispensing mechanism due to the product being carried thereon, and apparatus for moving the feeding mechanism relative to the dispensing mechanism in response thereto. The control method comprises the steps of determining the displacement of the center of gravity of the dispensing mechanism due to the product being carried thereon, and moving the feeding device relative to the dispensing mechanism in response thereto.

20 Claims, 4 Drawing Sheets

DEVICE AND METHOD FOR CONTROLLING DISTRIBUTIVE FEEDING DEVICE

BACKGROUND OF THE INVENTION

This invention relates to a device and method for automatically controlling the feed from a distributive feeding device of the type used for feeding product to each weighing unit of an automatic combination weighing machine having circularly arranged weighing units.

Figure 1:
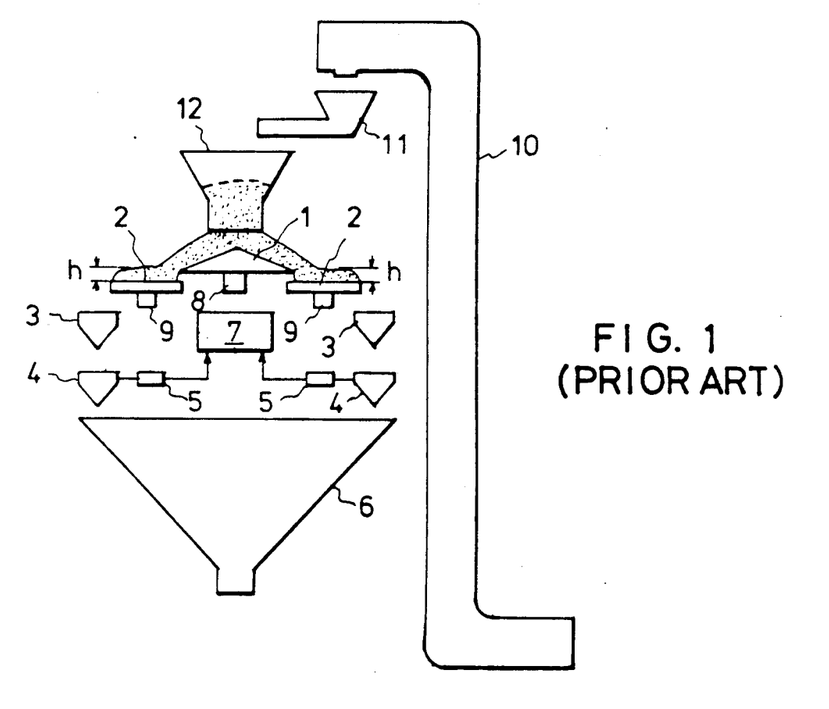
FIG. 1 is a schematic view of a prior art automatic combination weighing machine with which the system of this invention is adapted for use.

A typical combination weighing machine of the circular array type includes, as shown in FIG. 1, a centrally disposed conical dispersion feeder 1, a plurality of linear conveyer troughs 2 (only two of which are shown) arranged radially therearound, a feed hopper 3 under each conveyer trough, a weigh hopper 4 under each feed hopper, a weight sensor 5 associated with each weigh hopper, a collection chute 6 common to all of the weigh hoppers, and a combination control device 7 for effecting arithmetic of the weight signals from the weight sensors 5 to discharge product from selected weigh hoppers 4, to the collection chute 6. The dispersion feeder 1 and the conveyer troughs 2 are independently supported on a common machine frame (not shown) through their own vibrating mechanisms 8 and 9, respectively. Generally, during the operation of this combination weighing machine in full-automatic fashion, the product to be weighed is lifted above the combination weighing machine by a carrying device 10, such as a bucket conveyer, and thrown through a horizontal feeder 11 into a funnel chute 12 disposed directly above the dispersion feeder 1. The product is dispersed radially over the dispersion feeder 1 by its vibration, and is fed onto each of the surrounding conveyer troughs 2 as a continuous layer of thickness h as shown. The product on these conveyer troughs 2 moves by the aid of independent vibration of each conveyer trough falls into its respective underlying feed hopper 3. Accordingly, it can be understood that the amount of product fed to each feed hopper 3 is generally a function of the vibration time of the corresponding conveyer trough 2 and the thickness h of the product layer on this trough. As is well known to those skilled in this field, it is important to control the weight of the product fed to the respective weigh hoppers 4 or to the corresponding feed hoppers 3, so these weights are as uniform as possible in order to improve the accuracy of the weight of product weighed out every time with respect to a predetermined target weight. However, even if the vibration time of each conveyer trough 2 is kept constant, it is very difficult to provide a uniform amount of feed because of variations in the thickness and apparent density of the product layer due to variations in the state of product caused by aggregation and entanglement, and there has been no way for adjusting the amount of feed other than time-consuming manual work of a skilled operator.

Japanese patent opening gazette No. 60-196626, discloses an attempt at a solution to the above-mentioned problem. According to this system, the horizontal displacement of the center of gravity of the product in the weigh hoppers is arithmetically determined by analyzing the weight signals from the respective weight sensors. The funnel chute 12 is then moved in the direction opposite from the direction of displacement of the center of gravity from the central axis of the above-mentioned dispersion feeder 1 to compensate for the deviation in the amount of feed in the respective hoppers. Although this system has exhibited a substantial effect in obtaining uniformity of the weight signals from the weighing units, it does not compensate for the accuracy of the combined weight of product whose weights were used as the bases of compensation, since this product is already in the weigh hoppers. In other words, this system has a fundamental shortcoming in that it does not completely eliminate inaccuracy and non-uniformity of the weight of the product to the weigh hoppers.

Accordingly, an object of this invention is to provide an improved control device and method which controls the weight of the product delivered to each weigh hopper.

SUMMARY OF THE INVENTION

In contrast of the above-cited system in which the displacement of the center of gravity of the product contained in the weigh hoppers is detected, the system of this invention is adapted to detect the displacement of the center of gravity of the product being carried on the above-mentioned dispersion feeder and conveyer troughs and to move the above-mentioned funnel chute in a direction opposite from the direction of displacement.

According to this invention, therefore, there is provided a control device comprising means for detecting the horizontal displacement of the center of gravity of all product being carried by the dispersion feeder and all the surrounding conveyer troughs of a combination weighing machine, and means for moving the position at which product is fed to the dispersion feeder in a direction opposite from the direction of displacement of the center of gravity from the central axis of the dispersion feeder.

It should be apparent that the above-mentioned disadvantages of the prior art are avoided by the system of this invention, since the amount of feed is corrected before the product to be weighed leaves the conveyer troughs.

These and other objects and features of this invention will be described in more detail below in conjunction with a preferred embodiment thereof, with reference to the accompanying drawings.

BRIEF DESCRIPTION OF THE DRAWINGS

In the drawings:

FIG. 7 is a cross-sectional view along the X-axis of the structure of FIG. 6;

FIG. 9 is a plan view of a second alternative construction of the load detecting structure of FIG. 4;

FIG. 10 is a cross-sectional view along the X-axis of the structure of FIG. 9, and FIGS. 11(a) and (b) are enlarged front and side views, respectively, representing a load sensor in FIG. 9.

Throughout the drawings, same reference numerals are given to mutually corresponding structural components.

DETAILED DESCRIPTION OF PREFERRED EMBODIMENTS

Figure 2:
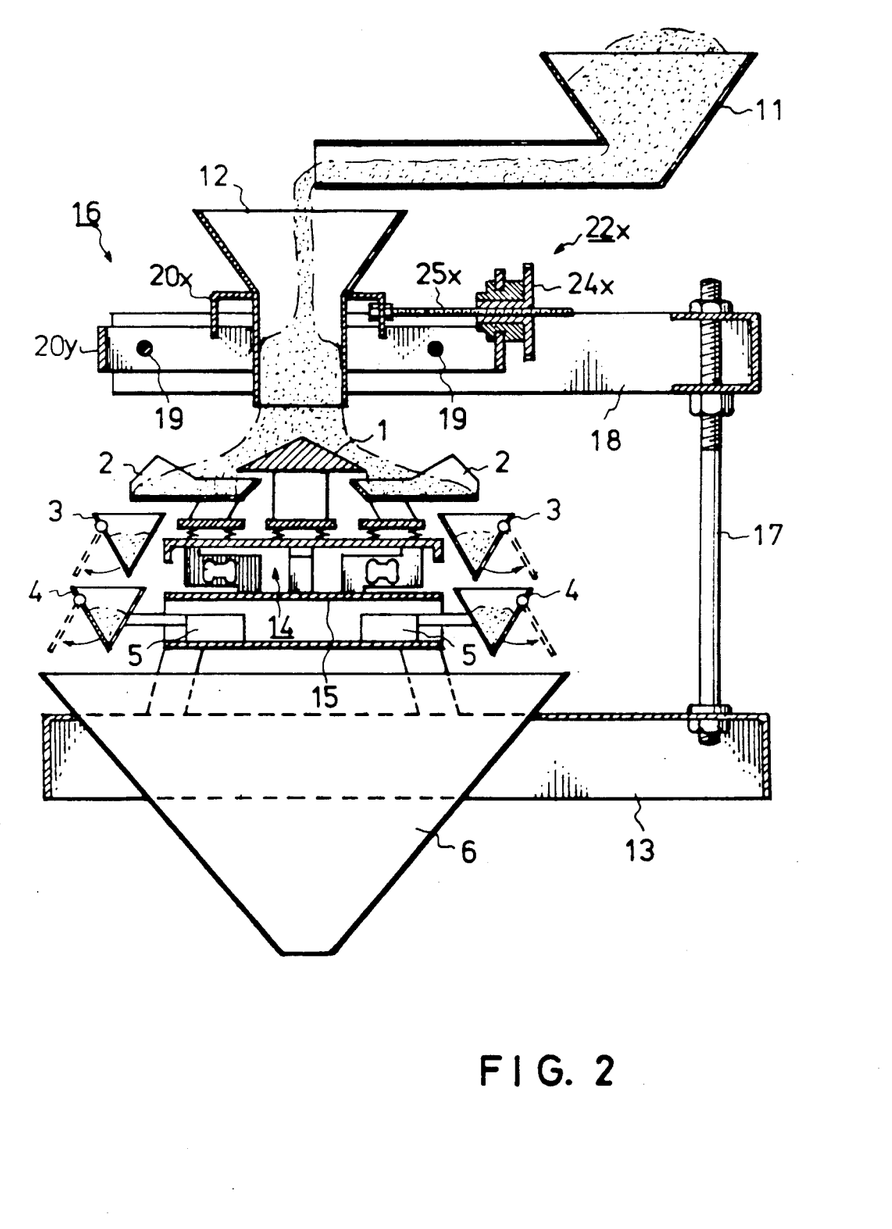
FIG. 2 is a schematic vertical cross-sectional view of a weighing machine incorporating a feed control device according to this invention.

Referring to FIG. 2 there is shown a combination weighing machine of the same general type as that of FIG. 1, but which includes a device for controlling a distributive feeding device constructed according to the principles of this invention and in which the central dispersion feeding device, or feeder 1, the linear conveyer troughs 2, the feed hoppers 3, the weigh hoppers 4, the weight sensors 5, the collection chute 6, the horizontal feeder 11, and the funnel chute 12 have the same structure and arrangement as those in FIG. 1, and operate in the same fashion as described above with reference to FIG. 1. In this embodiment, however, the dispersion feeder 1 and the linear conveyer troughs 2 are supported by the load detecting structure 14 of a center-of-gravity detecting device on a platform 15 which is fixed on a machine frame 13, as shown. The feed hoppers 3, the weigh hoppers 4, weight sensors 5, and the collection chute 6 are fixedly supported directly on the machine frame 13. In addition, the funnel chute 12 is not fixed directly to the machine frame 13, but is supported by a feeding position moving device indicated generally as 16.

Figure 3:
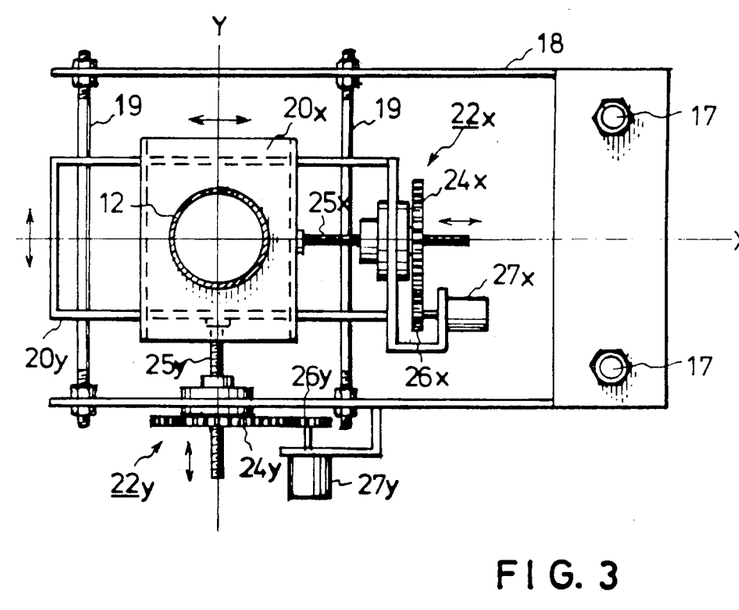
FIG. 3 is a partial cross-sectional plan view of the system of FIG. 2.

The feeding position moving device 16 includes, as shown in FIGS. 2 and 3, a stationary support frame 18 supported by the machine frame 13 through a pair of vertical support rods 17, with its vertical Position being adjustable. A movable Y frame 20y is slidably supported by the stationary frame 18 on a pair of guide rods 19 so that Y frame 20y is slidable in the Y direction as shown. A movable X frame 20x is slidably supported on the Y frame 20y so that X frame 20x is slidable in the Y drive mechanism 22y is supported on the stationary frame 18. An X drive mechanism 22x is support on the Y frame 20y. The funnel chute 12 is fixedly supported by the X frame 20x.

The drive mechanisms 22x and 22y include gears 24x and 24y, respectively, mounted on stationary frame 18 and Y frame 20y, respectively. The gears 24x and 24y each have a threaded hole in their centers for receiving a threaded rod 25x and 25y, respectively. The threaded rod 25x is secured at one end to the X frame 20x. The threaded rod 25y is secured at one end to the Y frame 22y. The gears 24x and 24y are driven by pinions 26x and 26y, respectively, on motors 27x and 27y. The motors 27x and 27y of the respective drive mechanisms are driven by a control device (described below) to drive the corresponding movable frames in X and Y directions, thereby moving the funnel chute 12 in any horizontal direction.

Figure 4:
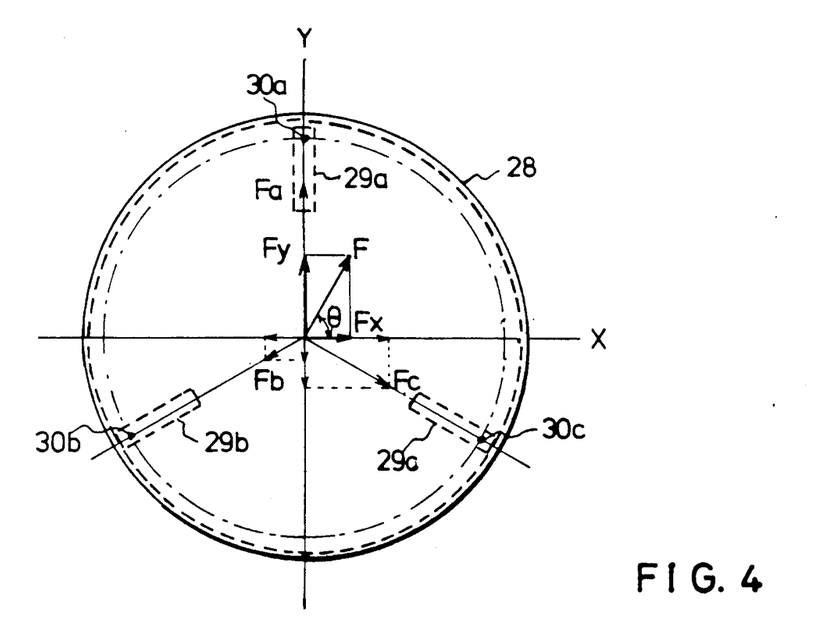
FIG. 4 is a plan view showing the load detecting structure of the center-of-gravity detecting device of the system of FIG. 2.

As shown in FIG. 4, the load detecting structure 14 includes a circular support base 28 on which the dispersion feeder 1 and conveyer troughs 2 are fixed through suitable buffer members, such as springs. Three load sensors 29a, 29b and 29c, such as load cells, are fixed at equal intervals on the bottom face of the support base 28, as shown, to support base 28 over the platform 15. Force points 30a, 30b and 30c of the load sensors 29a, 29b and 29c are all positioned on a common circle. The load sensors 29a, 29b and 29c generate load signals Fa, Fb and Fc, respectively, and supply them to a vector arithmetic unit 31 of the control device 33, described below. Here, it is assumed that the structure of FIG. 4 is arranged to have the vector direction of its load signal Fa coinciding with Y axis of the structure of FIG. 3.

Figure 5:
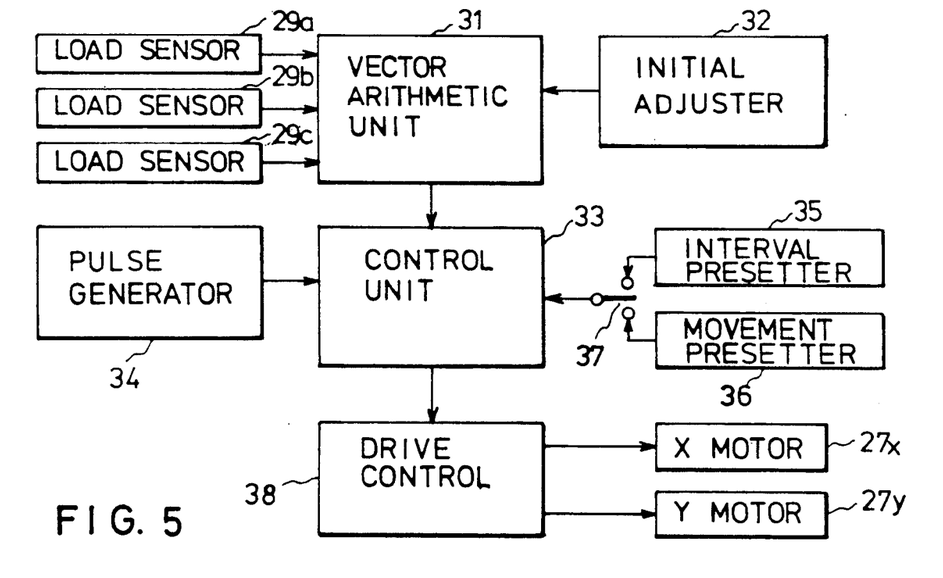
FIG. 5 is a block diagram showing the arithmetic and control units of the center-of-gravity detecting device of the system of FIG. 2.

The load signals Fa, Fb and Fc from the load sensors 29a, 29b and 29c of the load detecting structure 14 are supplied to the vector arithmetic unit 31 of the control device, as shown in FIG. 5, which sums up the X and Y components of these load signals as follows.

$$F_x = F_c \cos 30° - F_b \cos 30° = \sqrt{\frac{3}{2}} \ (F_c - F_b)$$

$$F_y = F_a - F_b \sin 30° - F_c \sin 30° = F_a - \frac{1}{2} (F_a + F_c)$$

Therefore, the magnitude of displacement of the center of gravity is proportional to $$F = \sqrt{F_x^2 + F_y^2}$$

and its direction 0 is represented as follows.

Tan $0 = F_y/F_x$

The numerical values Fx and Fy calculated by the vector arithmetic unit 31 are supplied to a control unit 33. When there is no product on either dispersion feeder 1 or conveyer troughs 2, the center of gravity ideally should be on the central axis or the origin in FIG. 4. However, this is not usually the case, and an initial value adjuster 32 is coupled to the vector arithmetic unit 31 for adjusting the values of Fx and Fy to zero in such a no-load condition, thereby positioning the apparent center of gravity at the origin.

A pulse generator 34 is coupled to the control unit 33 for supplying pulses to indicate successive discharge operation of the combination weighing machine. An interval presetter 35 and a movement presetter 36 are also coupled to the control unit 33 through a changeover switch 37. The interval presetter 35 is adapted to establish in the control unit 33 a pre-set time interval at which the center-of-gravity displacement detecting and compensating operation is to take place on account of the discharge operations. The movement presetter 36 is adapted to specify an arbitrary distance movement of the funnel chute 12 regardless of the magnitude of the output of the vector arithmetic unit 31 as occasion demands. When the movement has not been set by the movement presetter 36, the control unit 33 counts the input pulses from the pulse generator 34 and supplies the output of the vector arithmetic unit 31 to the drive control unit 38 every time it counts the preset value from the interval presetter 35. The drive control unit 38 multiplies the inputs $F_x$ and $F_y$ by a predetermined coefficient to calculate corresponding driving time periods and drives the motors 27x and 27y for these time periods. Thus, the funnel chute 12 is moved in a direction opposite to the direction of the composite force F of FIG. 4 to shift the product feeding position to a position opposite to the displaced center of gravity, thereby drawing back the center of gravity to the origin. When the distance of movement has been set by the movement presetter 36, the control unit 33 multiplies or divides $F_x$ and $F_y$ so that the composite force F corresponds to the preset distance of movement and supplies them to the drive control unit 38. Accordingly, the funnel chute 12 moves to a direction opposite to the composite force F by a preset amount. The above-mentioned preset interval and movement may be determined experientially in accordance with conditions such as properties of the handled product, variance of the weights, and the practical amount of displacement of the center of gravity.

Figure 6:
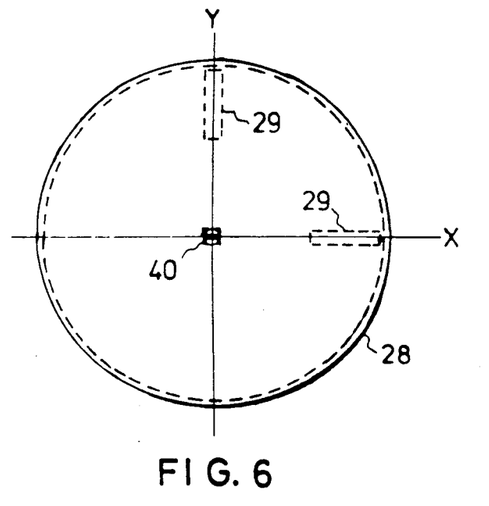
FIG. 6 is a plan view of a first alternative construction of the load detecting structure shown in FIG. 4.
Figure 8:
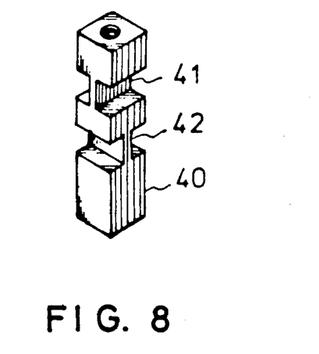
FIG. 8 is an enlarged perspective view of the central flexure in FIG. 6.

While three load sensors are used in the load detecting structure 14 of FIG. 4, a first alternative construction employing two load sensors 29 arranged on rectangular coordinates is shown in FIG. 6. In this case, a flexure 40, such as that shown in FIG. 8, is inserted between the platform 15 and the support base 28 for supporting the latter at its center. The flexure 40 is an elastic member having mutually orthogonal thin wall portions 41 and 42, and is fixed to face these thin wall portions with the respective load sensors as shown, so as to accommodate any inclination of the support base 28. With this structure, the vector arithmetic unit 31 need not have the above-described operation ability and may be omitted since the outputs of the load sensors 29 can be used directly as the values for $F_x$ and $F_y$.

Figures 7, 9, 10, 11A, 11B:
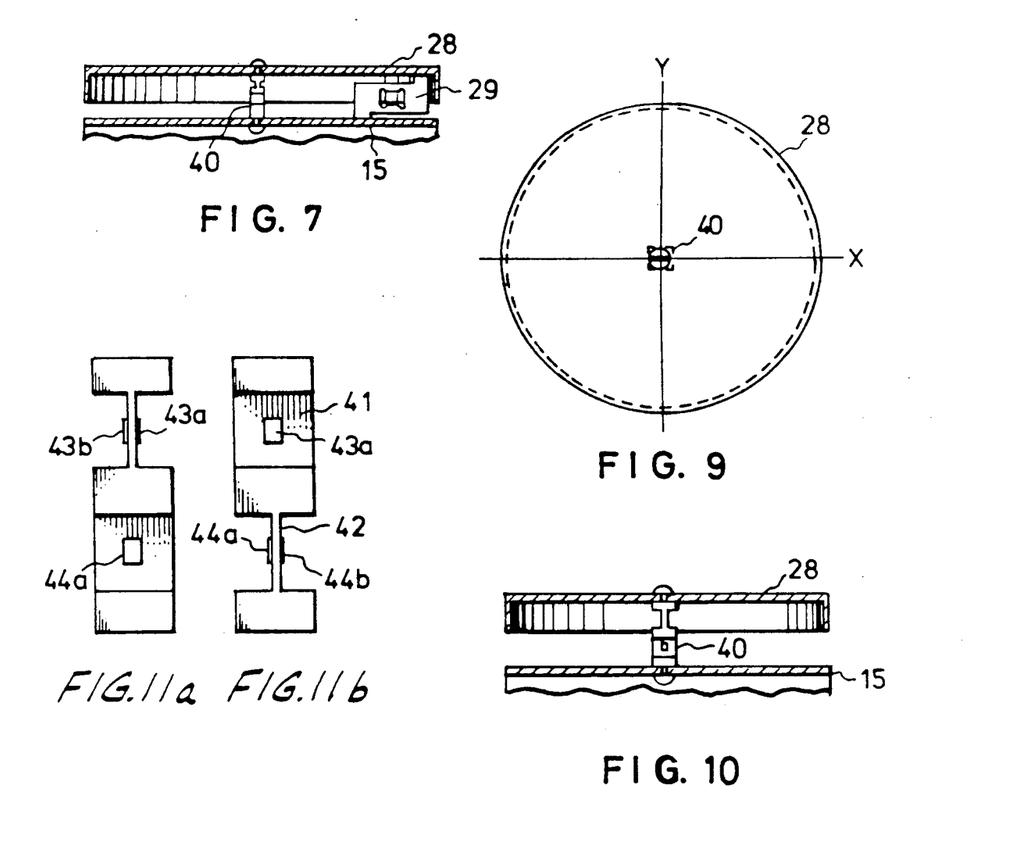

FIGS. 9 and 10 show a second alternative construction in which the load sensors 29 of FIGS. 6 and 7 are omitted, and the central flexure 40 is used as a load In this case, as shown in FIGS. 11(a) and (b), strain gauges 43a and 43b and 44a and 44b are adhered on opposite sides of the thin wall portions 41 and 42 of the flexure 40. The output of the strain gauges providing bending moment values $M_x$ and $M_y$ about both axes, which can be reused in lieu of the above-mentioned $F_x$ and $F_y$ to obtain the same effect.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A feed control device for a distributive feeding device of the type comprising a dispersion feeding device having a central axis for dispersively dispensing product fed thereto in the vicinity of said central axis radially toward the periphery thereof, and feeding means for feeding the product to a product feeding position on the dispersion feeding device in the vicinity of said central axis; said control device comprising:

displacement detecting means for supporting the dispersion feeding device and detecting the direction and magnitude of the displacement of the horizontal position of the center of gravity of the dispersion feeding device due to the product being carried thereon to produce a signal indicative thereof, and displacement compensating means responsive to said signal from said displacement detecting means to move said feeding means in a direction opposite to said direction of displacement with respect to the dispersion feeding device to change the product feeding position on the dispersion feeding device.

2. A feed control device as set forth in claim 1 wherein said displacement detecting means includes a plurality of load sensors which support said dispensing means, and arithmetic means for processing the weight signals from said load sensors to determine the horizontal displacement of said center of gravity as X and Y components of a vector on predetermined orthogonal co-ordinate axes, and wherein said displacement compensating means includes carriage means for supporting said feeding means for movement along said orthogonal co-ordinate axes, and XY driving means responsive to said X and Y components to move said carriage means in the X and Y directions.

3. A feed control device as set forth in claim 1 wherein said displacement detecting means includes an elastic post for supporting said dispensing means at said central axis, a plurality of strain gauges for sensing bending moments of said post, and arithmetic means for processing the outputs of said strain gauges to calculate a horizontal displacement of said center of gravity as X and Y components of a vector on a predetermined orthogonal co-ordinate axes, and wherein said displacement compensating means includes carriage means for supporting said feeding means for movement along said orthogonal co-ordinate axes, and XY driving means responsive to said X and Y components to move said carriage means in the X and Y directions.

4. A feed control device as set forth in claim 2 wherein they are three load sensors which are arranged to have their force points arranged at equal intervals around a common circle having its center on said central axis.

5. A feed control device as set forth in claim 2 wherein there are two load sensors arranged to have their force points positioned respectively on said orthogonal co-ordinate axes, and further comprising an elastic post at said central axis for supporting the dispersion feeding device.

6. A feed control method for a distributive feeding device of the type comprising a dispersion feeding device having a central axis for dispersively dispensing product fed thereto in the vicinity of said central axis radially toward the periphery thereof to a plurality of receiving units surrounding the dispersion feeding device, and feeding means for feeding the product to a product feeding position on the dispersion feeding device in the vicinity of said central axis; the method comprising the steps of:

detecting by measurements taken from said dispersion feeding device the direction and magnitude of displacement of the horizontal position of the center of gravity of the dispersion feeding device due to the product being carried thereon, and moving said feeding means with respect to the dispersion feeding device in a direction opposite to said direction of displacement to change the product feeding position on the dispersion feeding device.

7. A feed control method as set forth in claim 6 wherein the amount of said movement is proportional to the magnitude of said displacement of the center of gravity.

8. A feed control method for a distributive feeding device of the type comprising a dispersion feeding device having a central axis for dispersively dispensing product fed thereto in the vicinity of said central axis radially toward the periphery thereof to a plurality of receiving units surrounding the dispersion feeding device, and feeding means for feeding the product to a product feeding position on the dispersion feeding device in the vicinity of said central axis; the method comprising the steps of:

detecting the direction and magnitude of displacement of the horizontal position of the center of gravity of the dispersion feeding device due to the product carried thereon, and     moving said feeding means with respect to the dispersion feeding device in a direction opposite to said direction of displacement to change the product feeding position on the dispersion feeding device, the amount of said movement being independent of the magnitude of said displacement.

9. In a distributive feeding device of the type comprising a dispersion feeding device for radially distributing product to a plurality of receiving units surrounding the dispersion feeding device, and means for feeding product to a product receiving location on the dispersion feeding device, the improvement comprising:

displacement detecting means supporting the dispersion feeding device for detecting horizontal displacement of the center of gravity of the dispersion feeding device due to the product being carried thereon, and producing a signal indicative of such displacement;

compressing means responsive to the signal from the displacement detecting means for moving the product feeding device relative to the dispersion feeding device to change the product receiving location on the dispersion feeding device.

10. The improvement according to claim 9 wherein the compensating means includes means for moving the product feeding device relative to the dispersion feeding device in a direction opposite from the direction of displacement of the center of gravity.

11. The improvement according to claim 10 wherein the displacement detecting means includes means for detecting the magnitude of the displacement of the center of gravity, and wherein the compensating means comprises means for moving the product feeding device relative to the dispersion feeding device a distance proportional to the magnitude of the displacement.

12. The improvement according to claim 9 wherein the displacement detecting means comprises a plurality of load sensors supporting the dispersion feeding device to generate weight signals, and arithmetic processing means for processing the weight signals to determine the horizontal displacement of the center of gravity.

13. The improvement according to claim 12 wherein there are three equally spaced load sensors.

14. The improvement according to claim 12 wherein there are two load sensors, and further comprising a flexible support for supporting the dispersion feeding device, the flexible support freely flexing along axes aligned with each of the load sensors.

15. The improvement according to claim 9 wherein the displacement detecting means comprises a flexible support for supporting the dispersion feeding device; a plurality of strain gauges on the flexible support for producing signals proportional to the flexing of the support; and arithmetic processing means for processing the signals to determine the horizontal displacement of the center of gravity.

16. A method of controlling a distributive feeding device of the type comprising a dispersion feeding device for radially distributing product to a plurality of receiving units surrounding the dispersion feeding device, and means for feeding product to a product receiving location on the dispersion feeding device, the method comprising the steps of:

determining by measurements taken from said dispersion feeding device the direction of horizontal displacement of the center of gravity of the dispersion feeding device due to the product being carried thereon; and     moving the product feeding device relative to the dispersion feeding device to change the product receiving location on the dispersion feeding device.

17. The method according to claim 16 wherein the product feeding device is moved relative to the dispersion feeding device in a direction opposite from the direction of displacement.

18. The method according to claim 17 further comprising the step of determining the magnitude of the displacement of the center of gravity and moving the product feeding device relative to the dispersion feeding device a distance proportional to this magnitude.

19. A method of controlling a distributive feeding device of the type comprising a dispersion feeding device for radially distributing product to a plurality of receiving units surrounding the dispersion feeding device, and means for feeding product to a product receiving location on the dispersion feeding device, the method comprising the steps of:

measuring the weight of the dispersion feeding device with a plurality of load sensors and processing the signals from the load sensors to determine the direction of horizontal displacement of the center of gravity of the dispersion feeding device due to the product being carried thereon; and     moving the product feeding relative to the dispersion feeding device to change the product receiving location on the dispersion feeding device;

20. A method of controlling a distributive feeding device of the type comprising a dispersion feeding device for radially distributing product to a plurality of receiving units surrounding the dispersion feeding device, and means for feeding product to a product receiving location on the dispersion feeding device, the method comprising the steps of:

measuring the bending of at least one support for the dispersion feeding device with at least one strain gauge, and processing the signals from the strain gauge to determine the direction of horizontal displacement of the center of gravity of the dispersion feeding device due to the product being carried thereon; and     moving the product feeding means relative to the dispersion feeding device to change the product receiving location on the dispersion feeding device.

* * * * *

UNITED STATES PATENT AND TRADEMARK OFFICE
CERTIFICATE OF CORRECTION

PATENT NO. : 5,054,652

DATED : October 8, 1991

INVENTOR(S) : Yasushi Oshima et al

It is certified that error appears in the above-identified patent and that said Letters Patent is hereby corrected as shown below:

Column 3, line 38, "Position" should read --position--.

Column 5, lines 30-31, "load In this case" should read --- load sensor. In this case--.

Column 6, claim 4, line 33, "wherein they are" should read --wherein there are--.

Column 7, claim 9, line 30, " compresing means" should read --compensating means--.

Signed and Sealed this

First Day of June, 1993

Attest:

MICHAEL K. KIRK

*Attesting Officer*   Acting Commissioner of Patents and Trademarks

UNITED STATES PATENT AND TRADEMARK OFFICE
CERTIFICATE OF CORRECTION

PATENT NO. : 5,054,652

DATED : October 8, 1991

INVENTOR(S) : Yasushi Oshima et al.

It is certified that error appears in the above-identified patent and that said Letters Patent is hereby corrected as shown below:

Column 1, line 20, "effecting arithmetic" should read ---effecting combination arithmetic---.

Column 1, lines 37-38, "trough falls" should read ---trough and falls---.

Column 3, lines 43-44, "the Y drive mechanism" should read ---the x direction. A Y drive mechanism---.

Column 3, line 68, "to support base 28" should read ---to support the support base 28---.

Column 4, line 52, "distance movement" should read ---distance of movement---.

Signed and Sealed this

Twelfth Day of April, 1994

BRUCE LEHMAN

*Attest:*

*Attesting Officer*        *Commissioner of Patents and Trademarks*